US012523161B1

(12) United States Patent  
Clark et al.

(10) Patent No.: US 12,523,161 B1  
(45) Date of Patent: Jan. 13, 2026

(54) AIRCRAFT POWERPLANT GEARBOX WITH SELECTABLE POWER COUPLER

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/960,450

(22) Filed: Nov. 26, 2024

(51) Int. Cl.
| | |
|---|---|
| *F01D 15/10* | (2006.01) |
| *F02C 7/06* | (2006.01) |
| *F02C 7/32* | (2006.01) |
| *F02C 7/36* | (2006.01) |

(52) U.S. Cl.  
CPC ............... *F01D 15/10* (2013.01); *F02C 7/06* (2013.01); *F02C 7/32* (2013.01); *F02C 7/36* (2013.01); *F05D 2260/4031* (2013.01); *F05D 2260/98* (2013.01)

(58) Field of Classification Search  
CPC .. F01D 15/10; F01D 15/12; F02C 7/06; F02C 7/32; F02C 7/36; F05D 2260/4031; F05D 2260/98  
See application file for complete search history.

(56) References Cited

U.S. PATENT DOCUMENTS

| | | | |
|---|---|---|---|
| 7,481,062 B2 | 1/2009 | Gaines | |
| 10,422,243 B2 | 9/2019 | Suciu | |
| 10,563,591 B2 | 2/2020 | Muldoon | |
| 11,333,077 B2 | 5/2022 | Foutch | |
| 11,591,967 B2 | 2/2023 | Foutch | |
| 2020/0224606 A1* | 7/2020 | Dierksmeier | ........... F16H 48/22 |

* cited by examiner

*Primary Examiner* — Steven M Sutherland  
(74) *Attorney, Agent, or Firm* — Getz Balich LLC

(57) ABSTRACT

An aircraft powerplant assembly includes a gearbox and a power coupler. The gearbox includes a first engine power transfer apparatus, a second engine power transfer apparatus and an accessory power transfer apparatus. The power coupler is mounted to the gearbox. During a first operating mode, the power coupler is configured to operatively couple the first engine power transfer apparatus to the accessory power transfer apparatus and operatively decouple the second engine power transfer apparatus from the accessory power transfer apparatus. During a second operating mode, the power coupler is configured to operatively couple the second engine power transfer apparatus to the accessory power transfer apparatus and operatively decouple the first engine power transfer apparatus from the accessory power transfer apparatus.

17 Claims, 3 Drawing Sheets

AIRCRAFT POWERPLANT GEARBOX WITH SELECTABLE POWER COUPLER

BACKGROUND OF THE DISCLOSURE

1. Technical Field

This disclosure relates generally to an aircraft powerplant and, more particularly, to an accessory system for the aircraft powerplant.

2. Background Information

An aircraft powerplant such as a turbofan engine includes an accessory system. This accessory system may include various accessories such as fluid pumps, electric motors, electric generators, and the like coupled to an accessory gearbox. Various types and configurations of accessory systems are known in the art. While these known accessory systems have various benefits, there is still room in the art for improvement.

SUMMARY OF THE DISCLOSURE

According to an aspect of the present disclosure, an assembly is provided for an aircraft powerplant. This assembly includes a gearbox and a power coupler. The gearbox includes a first engine power transfer apparatus, a second engine power transfer apparatus and an accessory power transfer apparatus. The first engine power transfer apparatus is operatively independent from the second engine power transfer apparatus and the accessory power transfer apparatus within the gearbox. The second engine power transfer apparatus is operatively independent from the accessory power transfer apparatus within the gearbox. The power coupler is mounted to the gearbox. During a first operating mode, the power coupler is configured to operatively couple the first engine power transfer apparatus to the accessory power transfer apparatus and operatively decouple the second engine power transfer apparatus from the accessory power transfer apparatus. During a second operating mode, the power coupler is configured to operatively couple the second engine power transfer apparatus to the accessory power transfer apparatus and operatively decouple the first engine power transfer apparatus from the accessory power transfer apparatus.

According to another aspect of the present disclosure, another assembly is provided for an aircraft powerplant. This assembly includes a gearbox and a power coupler. The gearbox includes a gearbox housing, a first gear system, a second gear system and a pass-through shaft. The first gear system, the second gear system and the pass-through shaft are disposed in the gearbox housing. The pass-through shaft is mechanically independent of the first gear system and the second gear system in the gearbox housing. The power coupler is outside of the gearbox and mounted to the gearbox housing as a single self-contained unit. During a first operating mode, the power coupler is configured to operatively couple the first gear system to the pass-through shaft and operatively decouple the second gear system from the pass-through shaft. During a second operating mode, the power coupler is configured to operatively couple the second gear system to the pass-through shaft and operatively decouple the first gear system from the pass-through shaft.

According to still another aspect of the present disclosure, another assembly is provided for an aircraft powerplant. This assembly includes a gearbox, a first engine rotating structure, a second engine rotating structure, an engine accessory and a power coupler. The gearbox includes a first engine power transfer apparatus, a second engine power transfer apparatus and an accessory power transfer apparatus. The first engine rotating structure includes a first turbine rotor. The first engine rotating structure is operatively coupled to the first engine rotating structure independent of the second engine power transfer apparatus and the accessory power transfer apparatus. The second engine rotating structure includes a second turbine rotor. The second engine rotating structure is operatively coupled to the second engine rotating structure independent of the first engine power transfer apparatus and the accessory power transfer apparatus. The engine accessory is mounted to the gearbox. The engine accessory includes an engine accessory rotor operatively coupled to the accessory power transfer apparatus independent of the first engine power transfer apparatus and the second engine power transfer apparatus. The power coupler is mounted to the gearbox. During a first operating mode, the power coupler is configured to mechanically couple the first engine power transfer apparatus to the accessory power transfer apparatus and mechanically decouple the second engine power transfer apparatus from the accessory power transfer apparatus. During a second operating mode, the power coupler is configured to mechanically couple the second engine power transfer apparatus to the accessory power transfer apparatus and mechanically decouple the first engine power transfer apparatus from the accessory power transfer apparatus.

The engine accessory may be configurable as at least one of an electric motor during a motor operating mode or an electric generator during a generator operating mode.

The assembly may also include an engine accessory mounted to the gearbox. The engine accessory may include an engine accessory rotor operatively coupled to the accessory power transfer apparatus independent of the power coupler.

The gearbox may extend between opposing sides of the gearbox. The power coupler may be disposed to a first of the opposing sides of the gearbox. The engine accessory may be disposed to a second of the opposing sides of the gearbox.

The accessory power transfer apparatus may be configured as or otherwise include a pass-through shaft extending through the gearbox.

The engine accessory may be configured as or otherwise include an electric machine.

The engine accessory may be configurable as at least one of an electric motor or an electric generator.

The power coupler may be configured as a single line replaceable unit that is removably mounted to the gearbox independent of the engine accessory.

The assembly may also include a second engine accessory mounted to the gearbox. The second engine accessory may include a second engine accessory rotor operatively coupled to the first engine power transfer apparatus independent of the power coupler.

The assembly may also include a third engine accessory mounted to the gearbox. The third engine accessory may include a third engine accessory rotor operatively coupled to the second engine power transfer apparatus independent of the power coupler.

The assembly may also include a first engine rotating structure comprising a first turbine rotor. The first engine rotating structure may be operatively coupled to the gearbox through the first engine rotating structure and independent of the power coupler.

The assembly may also include a second engine rotating structure comprising a second turbine rotor. The second engine rotating structure may be operatively coupled to the gearbox through the second engine rotating structure and independent of the power coupler.

The assembly may also include a lubrication system servicing the gearbox. The lubrication system may be fluidly decoupled from the power coupler.

The power coupler may include a first clutch configured to: operatively couple the first engine power transfer apparatus to the accessory power transfer apparatus during the first operating mode; and operatively decouple the first engine power transfer apparatus from the accessory power transfer apparatus during the second operating mode.

The power coupler may also include a second clutch configured to: operatively couple the second engine power transfer apparatus to the accessory power transfer apparatus during the second operating mode; and operatively decouple the second engine power transfer apparatus from the accessory power transfer apparatus during the first operating mode.

The power coupler may include a first gear system and a second gear system. The first gear system may be configured to operatively couple the first engine power transfer apparatus to the accessory power transfer apparatus during the first operating mode. The second gear system may be configured to operatively couple the second engine power transfer apparatus to the accessory power transfer apparatus during the second operating mode.

The assembly may also include a compressor section, a combustor section, a first turbine section, a second turbine section, a flowpath, a first engine rotating structure and a second engine rotating structure. The flowpath may extend through the compressor section, the combustor section, the first turbine section and the second turbine section from an inlet into the flowpath to an exhaust from the flowpath. The first engine rotating structure may include a first turbine rotor disposed in the first turbine section. The first engine rotating structure may be operatively coupled to the power coupler through the first engine rotating structure. The second engine rotating structure may include a second turbine rotor disposed in the second turbine section. The second engine rotating structure may be operatively coupled to the power coupler through the second engine rotating structure.

The gearbox further may include a gearbox housing. The first engine power transfer apparatus may include a first gear system disposed in the gearbox housing.

The second engine power transfer apparatus may include a second gear system disposed in the gearbox housing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
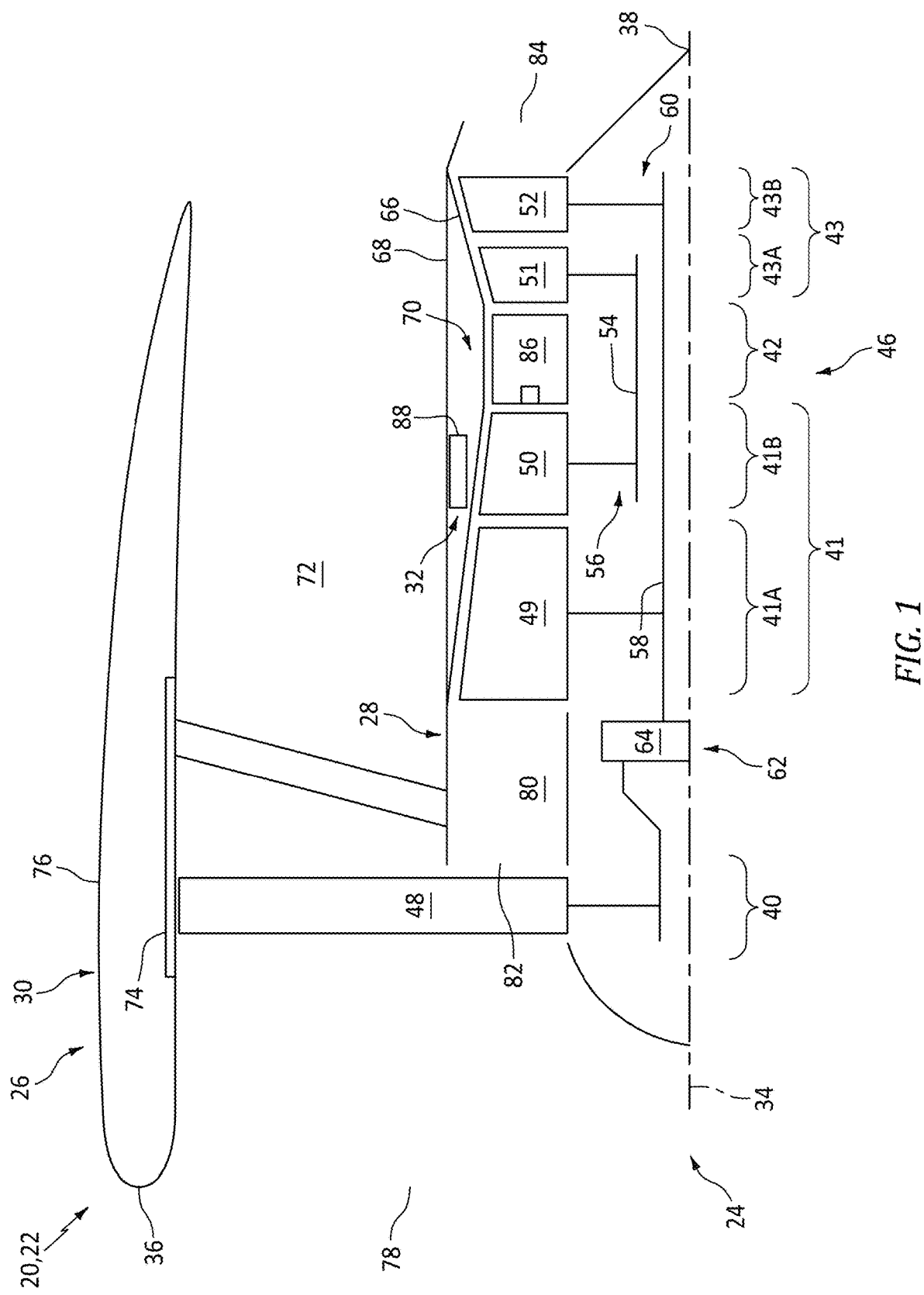
FIG. 1 is a partial schematic sectional illustration of an aircraft propulsion system.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted or open rotor propulsion system. Moreover, the aircraft powerplant 20 is not limited to propulsion system applications. The aircraft powerplant 20, for example, may alternatively (or also) be configured as an electrical power system for the aircraft; e.g., an auxiliary power unit (APU).

The aircraft propulsion system 22 includes a gas turbine engine 24 (e.g., a turbofan engine) housed within a stationary engine housing 26, which engine housing 26 of FIG. 1 includes an inner housing structure 28 and an outer housing structure 30. The aircraft propulsion system 22 also includes an accessory system 32 servicing one or more components and/or sub-systems of the aircraft propulsion system 22 and its turbine engine 24. The aircraft propulsion system 22 extends axially along an axis 34 between an axial forward, upstream end 36 of the aircraft propulsion system 22 and an axial aft, downstream end 38 of the aircraft propulsion system 22. Briefly, the powerplant axis 34 may be a centerline axis of the aircraft propulsion system 22, the turbine engine 24 and/or one or more of its members. The powerplant axis 34 may also or alternatively be a rotational axis for one or more members of the turbine engine 24.

The aircraft propulsion system 22 and its turbine engine 24 of FIG. 1 includes a propulsor section 40 (e.g., a fan section), a compressor section 41, a combustor section 42 and a turbine section 43. The compressor section 41 of FIG. 1 includes a low pressure compressor (LPC) section 41A and a high pressure compressor (HPC) section 41B. The turbine section 43 of FIG. 1 includes a high pressure turbine (HPT) section 43A and a low pressure turbine (LPT) section 43B. Here, at least (or only) the LPC section 41A, the HPC section 41B, the combustor section 42, the HPT section 43A and the LPT section 43B collectively form a core 46 of the turbine engine 24.

The engine sections 40-43B may be arranged sequentially along the powerplant axis 34 within the engine housing 26. The propulsor section 40 includes a bladed propulsor rotor 48; e.g., a fan rotor. The LPC section 41A includes a bladed low pressure compressor (LPC) rotor 49. The HPC section 41B includes a bladed high pressure compressor (HPC) rotor 50. The HPT section 43A includes a bladed high pressure turbine (HPT) rotor 51. The LPT section 43B includes a bladed low pressure turbine (LPT) rotor 52. The propulsor rotor 48, the LPC rotor 49, the HPC rotor 50, the HPT rotor 51 and the LPT rotor 52 each include a rotor base (e.g., a disk or a hub) and a plurality of rotor blades (e.g., airfoils, rotor vanes, etc.). The rotor blades are arranged and may be equispaced circumferentially around the respective rotor base in one or more arrays. With this arrangement, the rotor blades may be arranged into one or more stages. Each of the rotor blades is connected to (e.g., formed integral with or otherwise attached to) the respective rotor base. Each of the rotor blades projects radially (e.g., spanwise) out from the respective rotor base to a distal tip of the respective rotor blade.

The HPC rotor 50 is coupled to and rotatable with the HPT rotor 51. The HPC rotor 50 of FIG. 1, for example, is connected to the HPT rotor 51 through a high speed shaft 54. At least (or only) the HPC rotor 50, the HPT rotor 51 and the high speed shaft 54 collectively form a high speed rotating structure 56; e.g., a high speed spool of the engine core 46. This high speed rotating structure 56 of FIG. 1 and its members 50, 51 and 54 are rotatable about the powerplant axis 34. However, it is contemplated the high speed rotating structure 56 may alternatively be rotatable about another axis radially and/or angularly offset from the rotational axis of the propulsor rotor 48 and/or the centerline axis of the turbine engine 24.

The LPC rotor 49 is coupled to and rotatable with the LPT rotor 52. The LPC rotor 49 of FIG. 1, for example, is connected to the LPT rotor 52 through a low speed shaft 58. At least (or only) the LPC rotor 49, the LPT rotor 52 and the low speed shaft 58 collectively form a low speed rotating structure 60; e.g., a low speed spool of the engine core 46. This low speed rotating structure 60 is further coupled to the propulsor rotor 48 through a drivetrain 62. The drivetrain 62 may be configured as a geared drivetrain, where a geartrain 64 (e.g., a transmission, a speed change device, an epicyclic geartrain, etc.) is disposed between and operatively couples the propulsor rotor 48 to the low speed rotating structure 60 and its LPT rotor 52. With this arrangement, the propulsor rotor 48 may rotate at a different (e.g., slower) rotational speed than the low speed rotating structure 60 and its LPT rotor 52. Alternatively, the drivetrain 62 may be configured as a direct-drive drivetrain, where the geartrain 64 is omitted. With such an arrangement, the propulsor rotor 48 rotates at a common (the same) rotational speed as the low speed rotating structure 60 and its LPT rotor 52. The low speed rotating structure 60 of FIG. 1 and its members 49, 52 and 58 as well as the propulsor rotor 48 are rotatable about the powerplant axis 34. However, it is contemplated the low speed rotating structure 60 may alternatively be rotatable about another axis radially and/or angularly offset from the rotational axis of the propulsor rotor 48 and/or the centerline axis of the turbine engine 24.

The inner housing structure 28 of FIG. 1 includes an inner case 66 (e.g., a core case) for the turbine engine 24, an inner nacelle structure 68 (sometimes referred to as an inner fixed structure (IFS)) and an internal inner housing compartment 70. The inner case 66 is disposed radially outboard of, extends axially along and may circumscribe one or more or all of the engine sections 41A-43B and their respective engine rotors 49-52. The inner case 66 may thereby house and provide a support structure for the respective engine sections 41A-43B and their respective engine rotors 49-52. The inner nacelle structure 68 is configured to provide an aerodynamic cover over the engine core 46 and its inner case 66. The inner housing compartment 70 of FIG. 1 is formed by and is disposed radially between the inner case 66 and an inner barrel of the inner nacelle structure 68. The inner housing structure 28 and its inner nacelle structure 68 may also form a radial inner peripheral boundary of a bypass flowpath 72 (e.g., an annular bypass flowpath) within the aircraft propulsion system 22.

The outer housing structure 30 of FIG. 1 includes an outer case 74 (e.g., a fan case) for the turbine engine 24 and an outer nacelle structure 76. The outer case 74 is disposed radially outboard of, extends axially along and may circumscribe the propulsor section 40 and its propulsor rotor 48. The outer case 74 may thereby house and provide a containment structure for the propulsor section 40 and its propulsor rotor 48. The outer nacelle structure 76 is configured to provide an aerodynamic cover over the outer case 74. The outer housing structure 30 and its outer nacelle structure 76 may also form a radial outer peripheral boundary of the bypass flowpath 72.

During operation, ambient air from outside of the aircraft enters the aircraft propulsion system 22 and its turbine engine 24 through an airflow inlet 78. This air is directed across the propulsor section 40 and into a core flowpath 80 (e.g., annular core flowpath) and the bypass flowpath 72. The core flowpath 80 of FIG. 1 extends sequentially through the LPC section 41A, the HPC section 41B, the combustor section 42, the HPT section 43A and the LPT section 43B from an airflow inlet 82 into the core flowpath 80 to a combustion products exhaust 84 out from the core flowpath 80 and the engine core 46. The air entering the core flowpath 80 may be referred to as "core air". The bypass flowpath 72 extends through a bypass duct, which bypass flowpath 72 and bypass duct bypass (e.g., are disposed radially outboard of and extend along) the engine core 46 and the inner housing structure 28. The air within the bypass flowpath 72 may be referred to as "bypass air".

The core air is compressed by the LPC rotor 49 and the HPC rotor 50 and is directed into a combustion chamber 86 (e.g., an annular combustion chamber) of a combustor (e.g., an annular combustor) in the combustor section 42. Fuel is injected into the combustion chamber 86 by one or more fuel injectors and mixed with the compressed core air to provide a fuel-air mixture. This fuel-air mixture is ignited and combustion products thereof flow through and sequentially drive rotation of the HPT rotor 51 and the LPT rotor 52 about the powerplant axis 34. The rotation of the HPT rotor 51 and the LPT rotor 52 respectively drive rotation of the HPC rotor 50 and the LPC rotor 49 about the powerplant axis 34 and, thus, compression of the air received from the core inlet 82. The rotation of the LPT rotor 52 also drives rotation of the propulsor rotor 48. The rotation of the propulsor rotor 48 propels the bypass air through and out of the bypass flowpath 72. The propulsion of the bypass air may account for a majority of thrust generated by the turbine engine 24 of FIG. 1.

While the turbine engine 24 is described above with a particular two rotating structure arrangement, the present disclosure is not limited thereto. For example, the LPC rotor 49 may be omitted to configure the LPT rotor 52 as a power turbine (PT) rotor for the propulsor rotor 48. In another example, the turbine engine 24 may also include another rotating structure; e.g., an intermediate speed spool for the engine core 46.

Figure 2:
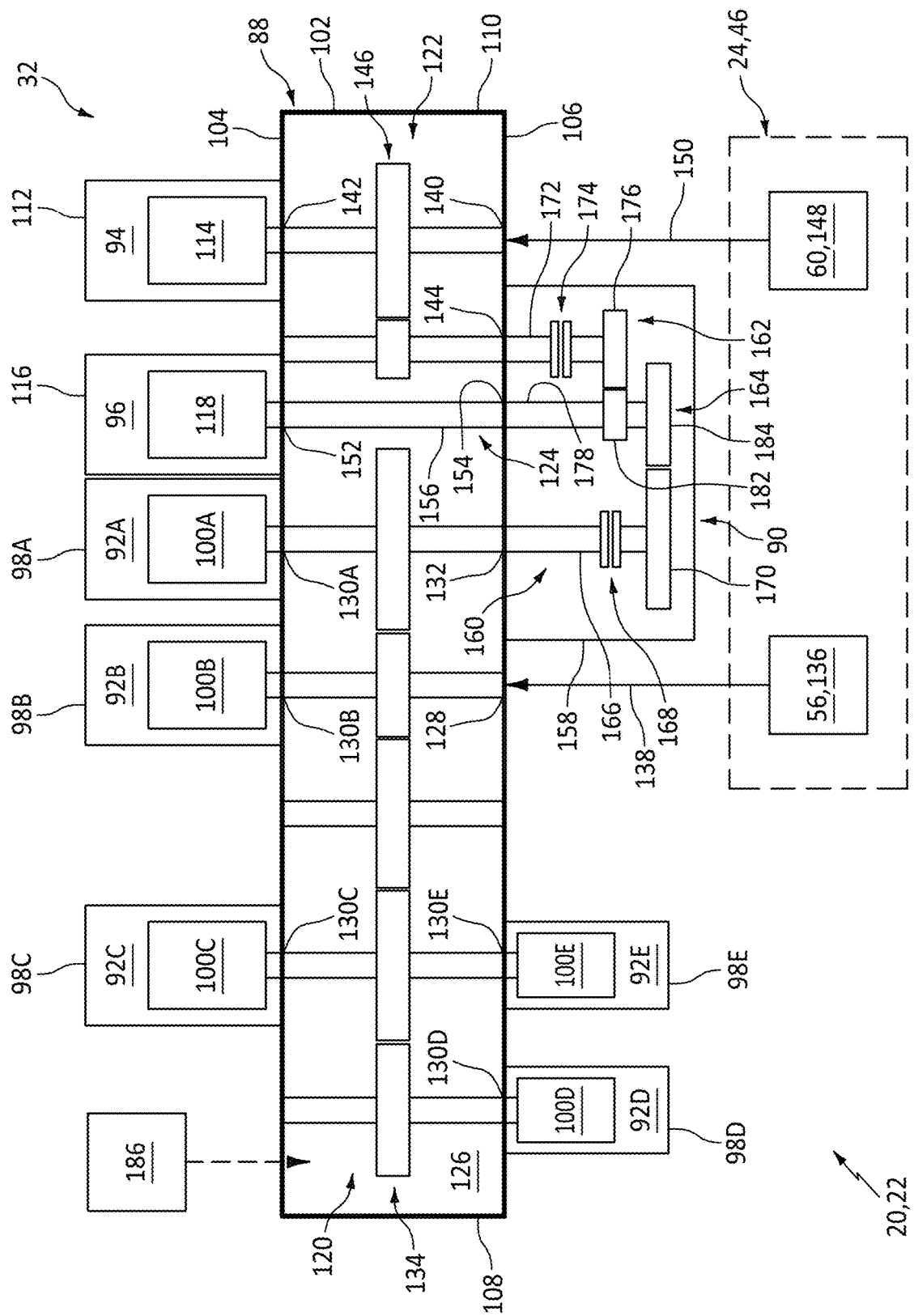
FIG. 2 is a schematic illustration of a portion of the aircraft propulsion system with an accessory system.

Referring to FIG. 2, the accessory system 32 includes a set of one or more gearbox mounted engine accessories, an accessory gearbox 88 and a power coupler 90 for the accessory gearbox 88. The gearbox mounted engine accessories of FIG. 2 includes one or more first engine accessories 92A-E (generally referred to as "92"), a second engine accessory 94 and a third engine accessory 96. The present disclosure, however, is not limited to such an exemplary gearbox mounted engine accessory arrangement. For example, the accessory system 32 may be configured with multiple second engine accessories 94 and/or multiple third engine accessories 96. Moreover, it is contemplated the accessory system 32 may alternatively be configured without the first engine accessories 92 and/or the second engine accessory 94.

Each of the first engine accessories 92A-E includes a first engine accessory housing 98A-E (generally referred to as "98") (e.g., a case) and a first engine accessory rotor 100A-E (generally referred to as "100") at least partially housed within the respective first engine accessory housing 98A-E. Each first engine accessory 92 is mounted to or otherwise arranged with the accessory gearbox 88. The first engine accessory housing 98 of each first engine accessory 92, for example, may be mechanically fastened and/or otherwise attached to a housing 102 (e.g., a case) of the accessory gearbox 88. Briefly, the gearbox housing 102 of FIG. 2 extends axially along the powerplant axis 34 (see FIG. 1) between opposing axial sides 104 and 106 of the accessory gearbox 88 and its gearbox housing 102. The gearbox housing 102 of FIG. 2 also extends laterally (e.g., circumferentially and/or tangentially) between opposing lateral ends 108 and 110 of the accessory gearbox 88 and its gearbox housing 102. The first engine accessories 92A-C may be disposed at (e.g., on, adjacent or proximate) the gearbox first side 104. The first engine accessories 92A-C of FIG. 2, for example, are arranged laterally along the gearbox first side 104 between the gearbox first end 108 and the third engine accessory 96. The first engine accessories 92D and 92E of may be disposed at the gearbox second side 106. The first engine accessories 92D and 92E of FIG. 2, for example, are arranged laterally along the gearbox second side 106 between the gearbox first end 108 and the power coupler 90. The present disclosure, however, is not limited to such an exemplary arrangement. All of the first engine accessories 92, for example, may be disposed to the gearbox first side 104 or the gearbox second side 106.

The second engine accessory 94 includes a second engine accessory housing 112 (e.g., a case) and a second engine accessory rotor 114 at least partially housed within the second engine accessory housing 112. The second engine accessory 94 is mounted to or otherwise arranged with the accessory gearbox 88. The second engine accessory housing 112, for example, may be mechanically fastened and/or otherwise attached to the gearbox housing 102. The second engine accessory 94 may be disposed at the gearbox first side 104. The second engine accessory 94 of FIG. 2, for example, is arranged laterally along the gearbox first side 104 between the gearbox second end 110 and the third engine accessory 96. The present disclosure, however, is not limited to such an exemplary arrangement. For example, the second engine accessory 94 may alternatively be arranged laterally along the gearbox second side 106 between the gearbox second end 110 and the power coupler 90.

The third engine accessory 96 includes a third engine accessory housing 116 (e.g., a case) and a third engine accessory rotor 118 at least partially housed within the third engine accessory housing 116. The third engine accessory 96 is mounted to or otherwise arranged with the accessory gearbox 88. The third engine accessory housing 116, for example, may be mechanically fastened and/or otherwise attached to the gearbox housing 102. The third engine accessory 96 may be disposed at the gearbox first side 104. The third engine accessory 96 of FIG. 2, for example, is arranged laterally along the gearbox first side 104 between the first engine accessories 92A and the second engine accessory 94. Here, the third engine accessory 96 is laterally aligned with and axially opposite the power coupler 90.

Examples of the engine accessories 92, 94 and 96 include, but are not limited to, fluid pump(s), fluid conditioner(s) and/or electric machine(s). Examples of the fluid pumps include, but are not limited to, fuel pump(s), hydraulic pump(s) and/or lubricant pump(s). Examples of the fluid conditioners include, but are not limited to, de-oiler(s) and/or separator(s). Examples of the electric machines include, but are not limited to, variable frequency generator(s), integral drive generator(s), permanent magnet motor-generator(s) and/or permanent magnet motor(s).

The accessory gearbox 88 includes the gearbox housing 102, a first engine power transfer apparatus 120, a second engine power transfer apparatus 122 and an accessory power transfer apparatus 124. Each of the power transfer apparatuses 120, 122 and 124 is partially or completely housed within the gearbox housing 102. The power transfer apparatuses 120, 122 and 124 of FIG. 2, for example, may be partially or completely located within a common (e.g., the same) internal gearbox compartment 126 of the gearbox housing 102.

The first engine power transfer apparatus 120 is operatively independent of the other power transfer apparatuses 122 and 124 within the accessory gearbox 88 and its gearbox housing 102. The first engine power transfer apparatus 120 of FIG. 2, for example, is spatially separated from and mechanically decoupled from the other power transfer apparatuses 122 and 124 within the accessory gearbox 88 and its gearbox housing 102. By contrast, the first engine power transfer apparatus 120 of FIG. 2 may be selectively operatively coupled to the accessory power transfer apparatus 124 outside of the accessory gearbox 88 as described below. However, the first engine power transfer apparatus 120 may be operatively independent of the second engine power transfer apparatus 122 outside of the accessory gearbox 88 (e.g., during all modes of operation).

The first engine power transfer apparatus 120 of FIG. 2 includes a first engine coupling 128, one or more first engine accessory couplings 130A-E (generally referred to as "130"), a first power coupler coupling 132 and a first gearbox gear system 134. The first engine coupling 128 is operatively coupled to a first engine rotating structure 136 through, for example, a first drivetrain 138. This first drivetrain 138 may be configured as or otherwise include a shaft, a tower shaft assembly, another gearbox (e.g., an angle gearbox), and/or the like. For case of description, the first engine rotating structure 136 may be described below as the high speed rotating structure 56. However, in other embodiments, it is contemplated the first engine rotating structure 136 may alternatively be the low speed rotating structure 60 or another rotating structure within the engine core 46. Each first engine accessory coupling 130 of FIG. 2 is operatively coupled to the first engine accessory rotor 100 of a respective one of the first engine accessories 92. The first gearbox gear system 134 is (e.g., completely) housed within the accessory gearbox 88. This first gearbox gear system 134 is operatively coupled between and operatively interconnects the various first engine power transfer apparatus couplings 128, 130 and 132.

The second engine power transfer apparatus 122 is operatively independent of the other power transfer apparatuses 120 and 124 within the accessory gearbox 88 and its gearbox housing 102. The second engine power transfer apparatus 122 of FIG. 2, for example, is spatially separated from and mechanically decoupled from the other power transfer apparatuses 120 and 124 within the accessory gearbox 88 and its gearbox housing 102. By contrast, the second engine power transfer apparatus 122 of FIG. 2 may be selectively operatively coupled to the accessory power transfer apparatus 124 outside of the accessory gearbox 88 as described below. However, the second engine power transfer apparatus 122 may be operatively independent of the first engine power transfer apparatus 120 outside of the accessory gearbox 88 (e.g., during all modes of operation).

The second engine power transfer apparatus 122 of FIG. 2 includes a second engine coupling 140, a second engine accessory coupling 142, a second power coupler coupling 144 and a second gearbox gear system 146. The second engine coupling 140 is operatively coupled to a second engine rotating structure 148 through, for example, a second drivetrain 150. This second drivetrain 150 may be configured as or otherwise include a shaft, a tower shaft assembly, another gearbox (e.g., an angle gearbox), and/or the like. For case of description, the second engine rotating structure 148 may be described below as the low speed rotating structure 60. However, in other embodiments, it is contemplated the second engine rotating structure 148 may alternatively be the high speed rotating structure 56 or another rotating structure within the engine core 46. The second engine accessory coupling 142 of FIG. 2 is operatively coupled to the second engine accessory rotor 114. The second gearbox gear system 146 is (e.g., completely) housed within the accessory gearbox 88. This second gearbox gear system 146 is operatively coupled between and operatively interconnects the various second engine power transfer apparatus couplings 140, 142 and 144.

The accessory power transfer apparatus 124 is operatively independent of the engine power transfer apparatuses 120 and 122 within the accessory gearbox 88 and its gearbox housing 102. The accessory power transfer apparatus 124 of FIG. 2, for example, is spatially separated from and mechanically decoupled from the engine power transfer apparatuses 120 and 122 within the accessory gearbox 88 and its gearbox housing 102. By contrast, the accessory power transfer apparatus 124 of FIG. 2 may be selectively operatively coupled to the first engine power transfer apparatus 120 or the second engine power transfer apparatus 122 outside of the accessory gearbox 88 as described below.

The accessory power transfer apparatus 124 of FIG. 2 includes a third engine accessory coupling 152, a third power coupler coupling 154 and a pass-through shaft 156. The third engine accessory coupling 152 of FIG. 2 is operatively coupled to the third engine accessory rotor 118. This pass-through shaft 156 is operatively coupled between and operatively interconnects the accessory power transfer apparatus couplings 152 and 154. The third engine accessory coupling 152 of FIG. 2, for example, is connected to (or integrated as part of) the pass-through shaft 156 at a first end of the pass-through shaft 156. The third power coupler coupling 154 of FIG. 2 is connected to (or integrated as part of) the pass-through shaft 156 at a second end of the pass-through shaft 156, where the second end of the pass-through shaft 156 is opposite the first end of the pass-through shaft 156. Here, the pass-through shaft 156 passes axially through the accessory gearbox 88 and its gearbox housing 102. This pass-through shaft 156 is also arranged laterally between the first gearbox gear system 134 and the second gearbox gear system 146 within the accessory gearbox 88 and its gearbox housing 102.

The power coupler 90 of FIG. 2 includes a coupler housing 158 (e.g., a case), a first coupler assembly 160, a second coupler assembly 162 and a third coupler assembly 164, where each coupler assembly 160, 162 and 164 is at least partially or completely housed within the coupler housing 158. The power coupler 90 is removably mounted to or otherwise arranged with the accessory gearbox 88. The coupler housing 158, for example, may be mechanically fastened and/or otherwise attached to the gearbox housing 102. The power coupler 90 may be disposed at the gearbox second side 106. The power coupler 90 of FIG. 2, for example, is arranged laterally along the gearbox second side 106 between the first engine accessory 92E and the gearbox second end 110. More particularly, the power coupler 90 is located laterally between the engine couplings 128 and 140. Here, the power coupler 90 is laterally aligned with and axially opposite the third engine accessory 96. The power coupler 90 of FIG. 2 also laterally overlaps each of the power transfer apparatuses 120 and 122.

The first coupler assembly 160 includes a first coupler shaft 166, a first coupler clutch 168 and a first coupler gear 170. The first coupler shaft 166 is operatively coupled to the first engine power transfer apparatus 120. More particularly, the first coupler shaft 166 of FIG. 2 is connected to and rotatable with the first power coupler coupling 132. The first coupler clutch 168 is between the first coupler shaft 166 and the first coupler gear 170. This first coupler clutch 168 is configured to selectively (a) mechanically connect the first coupler shaft 166 to the first coupler gear 170 such that the first coupler shaft 166 is rotatable with the first coupler gear 170, or (b) mechanically disconnect the first coupler shaft 166 from the first coupler gear 170 such that the first coupler shaft 166 is rotatably independent from the first coupler gear 170 and vice versa.

The second coupler assembly 162 includes a second coupler shaft 172, a second coupler clutch 174 and a second coupler gear 176. The second coupler shaft 172 is operatively coupled to the second engine power transfer apparatus 122. More particularly, the second coupler shaft 172 of FIG. 2 is connected to and rotatable with the second power coupler coupling 144. The second coupler clutch 174 is between the second coupler shaft 172 and the second coupler gear 176. This second coupler clutch 174 is configured to selectively (a) mechanically connect the second coupler shaft 172 to the second coupler gear 176 such that the second coupler shaft 172 is rotatable with the second coupler gear 176, or (b) mechanically disconnect the second coupler shaft 172 from the second coupler gear 176 such that the second coupler shaft 172 is rotatably independent from the second coupler gear 176 and vice versa.

The third coupler assembly 164 includes a third coupler shaft 178 and a plurality of third coupler gears 182 and 184. The third coupler shaft 178 is operatively coupled to the accessory power transfer apparatus 124. More particularly, the third coupler shaft 178 of FIG. 2 is connected to and rotatable with the third power coupler coupling 154. Each of the third coupler gears 182 and 184 is connected to (e.g., mounted on) and rotatable with the third coupler shaft 178. One of the third coupler gears 184 is meshed with the first coupler gear 170. The other one of the coupler gears 182 is meshed with the second coupler gear 176.

During aircraft powerplant operation, the power coupler 90 is configured to selectively operatively couple the accessory power transfer apparatus 124 to the first engine power transfer apparatus 120 or the second engine power transfer apparatus 122, outside of and independent of the accessory gearbox 88. For example, during a first mode of operation, the power coupler 90 may operatively couple and transfer mechanical power between the accessory power transfer apparatus 124 and the first engine power transfer apparatus 120. During a second mode of operation, the power coupler 90 may operatively couple and transfer mechanical power between the accessory power transfer apparatus 124 and the second engine power transfer apparatus 122. During a third mode of operation, the power coupler 90 may operatively decouple the accessory power transfer apparatus 124 from both the first engine power transfer apparatus 120 and the second engine power transfer apparatus 122.

During the first operating mode, the first coupler clutch 168 may be engaged and the second coupler clutch 174 may be disengaged. By engaging the first coupler clutch 168, the first coupler assembly 160 and the third coupler assembly 164 operatively couple the third engine accessory rotor 118 to the first engine power transfer apparatus 120. The first engine power transfer apparatus elements 128, 130 and 132 may thereby rotate with the third engine accessory rotor 118. By contrast, by disengaging the second coupler clutch 174, the third coupler assembly 164 is operatively decoupled from the second coupler assembly 162. The second engine power transfer apparatus elements 140, 142 and 144 may thereby rotate independent of the third engine accessory rotor 118 and vice versa. Therefore, during this first operating mode, the third engine accessory rotor 118 may be rotationally driven by the first engine rotating structure 136 or the rotor 100 of one of the first engine accessories 92. Alternatively, the third engine accessory rotor 118 may drive rotation of (or mechanically boost power to) the first engine rotating structure 136 and/or the rotors 100 the first engine accessories 92.

During the second operating mode, the second coupler clutch 174 may be engaged and the first coupler clutch 168 may be disengaged. By engaging the second coupler clutch 174, the second coupler assembly 162 and the third coupler assembly 164 operatively couple the third engine accessory rotor 118 to the second engine power transfer apparatus 122. The second engine power transfer apparatus elements 140, 142 and 144 may thereby rotate with the third engine accessory rotor 118. By contrast, by disengaging the first coupler clutch 168, the third coupler assembly 164 is operatively decoupled from the first coupler assembly 160. The first engine power transfer apparatus elements 128, 130 and 132 may thereby rotate independent of the third engine accessory rotor 118 and vice versa. Therefore, during this second operating mode, the third engine accessory rotor 118 may be rotationally driven by the second engine rotating structure 148 or the second engine accessory rotor 114. Alternatively, the third engine accessory rotor 118 may drive rotation of (or mechanically boost power to) the second engine rotating structure 148 and/or the second engine accessory rotor 114.

During the third operating mode, both the first coupler clutch 168 and the second coupler clutch 174 are disengaged. The first engine power transfer apparatus elements 128, 130 and 132 may thereby rotate independent of the third engine accessory rotor 118, and vice versa. Similarly, the second engine power transfer apparatus elements 140, 142 and 144 may rotate independent of the third engine accessory rotor 118, and vice versa. Here, the third engine accessory 96 is operationally isolated from the operation of the engine core 46 (see FIG. 1).

In some embodiments, the mode of operation may be selected based on a rotational speed of the engine rotating structures 136 and/or 148. For example, when the second engine rotating structure 148 (e.g., the low speed rotating structure 60) is rotating at or below a threshold speed, the power coupler 90 may operate in the second operating mode. However, when the second engine rotating structure 148 is rotating above the threshold speed, the power coupler 90 may operate in the first operating mode. With such operation, the power coupler 90 may operate in the first operating mode during higher power phases of aircraft flight such as aircraft takeoff, aircraft climb and aircraft cruise. By contrast, the power coupler 90 may operate in the second operating mode during lower power phases of aircraft flight such as aircraft descent, aircraft landing, aircraft taxiing and during startup of the aircraft powerplant 20 while on ground. The present disclosure, of course, is not limited to the foregoing exemplary power coupler schedule.

In some embodiments, the power coupler 90 may be configured as a self-contained module. With such an arrangement, the power coupler 90 may have an internal lubrication system which is independent from a lubrication system 186 for the accessory gearbox 88. Possible contaminants generated by wear of the first coupler clutch 168 and/or the second coupler clutch 174 may thereby be kept out of the accessory gearbox 88, as well as other systems fluidly coupled to the accessory gearbox 88. In addition, by independently mounting the power coupler 90 to the accessory gearbox 88, the power coupler 90 may be removed from the accessory gearbox 88 as a single line replaceable unit (LRU) without requiring removal and/or disconnecting of aircraft powerplant components such as other engine accessories 92, 94 and 96.

Figure 3:
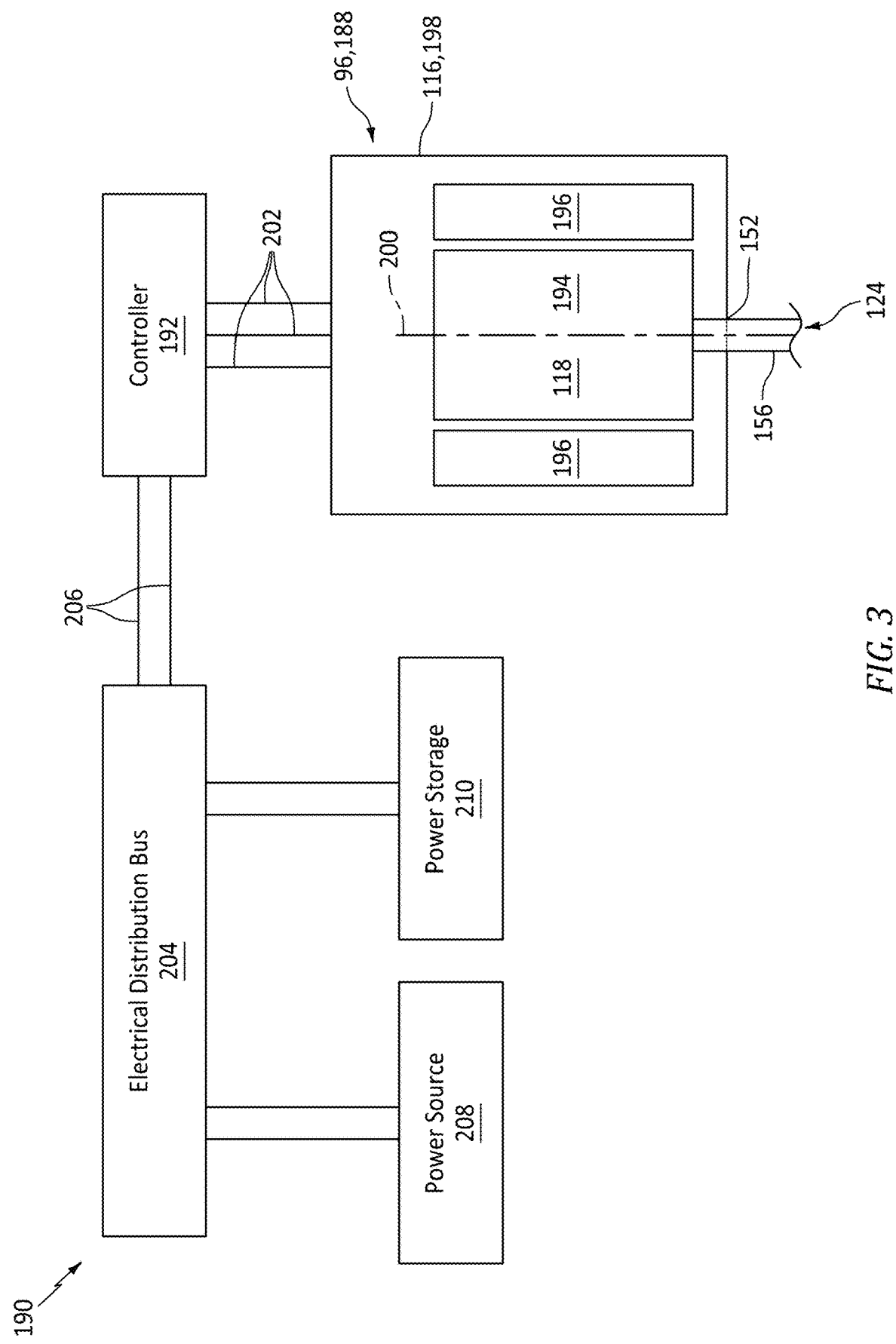
FIG. 3 is a schematic illustration of a portion of the aircraft propulsion system with an electric machine electrically coupled to an electrical system.

In some embodiments, referring to FIG. 3, the third engine accessory 96 may be configured as an electric machine 188 that is electrically coupled to an electrical system 190 through an electric machine (EM) controller 192. The electric machine 188 of FIG. 3 includes an electric machine rotor 194 (here, the third engine accessory rotor 118), an electric machine stator 196 and an electric machine housing 198 (here, the third engine accessory housing 116). The machine rotor 194 is rotatable about a rotational axis 200 of the machine rotor 194, which rotational axis 200 may also be an axial centerline of the electric machine 188 and coaxial with a rotational axis of the third coupler assembly 164 and its members 152, 154 and 156 (see FIG. 2). The machine stator 196 of FIG. 3 is radially outboard of and circumscribes the machine rotor 194. With this arrangement, each electric machine 188 is configured as a radial flux electric machine 188. The electric machine 188 of the present disclosure, however, is not limited to such an exemplary rotor-stator configuration nor to radial flux arrangements. The machine rotor 194, for example, may alternatively be radially outboard of and circumscribe the machine stator 196. In another example, the machine rotor 194 may be axially next to the machine stator 196 configuring the electric machine 188 as an axial flux electric machine. Referring again to FIG. 3, the machine rotor 194 and the machine stator 196 are at least partially or completely housed within and interior of the machine housing 198.

Each electric machine 188 of FIG. 3 may be configurable as an electric motor and/or an electric generator; e.g., an electric motor-generator. For example, during a motor mode of operation, the electric machine 188 may operate as the electric motor to convert electricity received from the aircraft electrical system 190. The machine stator 196, for example, may generate an electromagnetic field with the machine rotor 194 using a current of electricity received from the aircraft electrical system 190 through the EM controller 192. This electromagnetic field may drive rotation of the machine rotor 194. The machine rotor 194, in turn, may provide mechanical power to and drive rotation of the respective engine rotating structure 136, 148 (see FIG. 2) and/or other elements through the power coupler 90. This mechanical power may be provided to boost power or completely power the rotation of the respective engine rotating structure 136, 148 (see FIG. 2) and/or other elements. By contrast, during a generator mode of operation, the electric machine 188 may operate as the electric generator to convert mechanical power received from the respective engine rotating structure 136, 148 (see FIG. 2) and/or other elements into electricity. Rotation of the machine rotor 194, for example, may be rotationally driven by rotation of the respective engine rotating structure 136, 148 (see FIG. 2) and/or other elements through the power coupler 90. The rotation of the machine rotor 194 may generate an electromagnetic field with the machine stator 196, and the machine stator 196 may convert energy from the electromagnetic field into electricity. The electric machine 188 may then provide a current of electricity to the aircraft electrical system 190 through the EM controller 192 for storage and/or further use. The electric machine 188 of the present disclosure, however, is not limited to such exemplary operation. For example, the electric machine 188 may alternatively be configured as a dedicated electric generator; e.g., without the electric motor functionality. In another example, the electric machine 188 may be configured as a dedicated electric motor; e.g., without the electric generator functionality.

The EM controller 192 is electrically coupled to the electric machine 188 through one or more electric cables 202; e.g., high voltage electric cables, power feeder cables, etc. More particularly, controller circuitry in the EM controller 192 is electrically coupled to the electric machine 188 and its machine stator 196 through the electric cables 202. Similarly, the EM controller 192 is electrically coupled to an electrical distribution bus 204 of the aircraft electrical system 190 through one or more electric cables 206; e.g., high voltage electric cables, power feeder cables, etc. More particularly, the controller circuitry in the EM controller 192 is electrically coupled to the aircraft electrical system 190 and its electrical distribution bus 204 through the respective electric cables 206.

The EM controller 192 and its controller circuitry are configured to control operation of the electric machine 188. For example, when operating as the electric motor, the EM controller 192 is configured to regulate a flow of electricity from the aircraft electrical system 190 to the electric machine 188. This electricity flow regulation may include: (a) turning-on the flow of electricity from the aircraft electrical system 190 to the electric machine 188 (e.g., electrically coupling the electric machine 188 to the aircraft electrical system 190); (b) turning-off the flow of electricity from the aircraft electrical system 190 to the electric machine 188 (e.g., electrically decoupling the electric machine 188 from the aircraft electrical system 190); (c) moderating the flow of electricity from the aircraft electrical system 190 to the electric machine 188. Here, the EM controller 192 operates as a motor controller. In another example, when operating as the electric generator, the EM controller 192 is configured to regulate a flow of electricity from the electric machine 188 to the aircraft electrical system 190. This electricity flow regulation may include: (a) turning-on the flow of electricity from the electric machine 188 to the aircraft electrical system 190 (e.g., electrically coupling the electric machine 188 to the aircraft electrical system 190); (b) turning-off the flow of electricity from the electric machine 188 to the aircraft electrical system 190 (e.g., electrically decoupling the electric machine 188 from the aircraft electrical system 190); (c) moderating the flow of electricity from the electric machine 188 to the aircraft electrical system 190. Here, the EM controller 192 operates as a generator controller.

The aircraft electrical system 190 includes the electrical distribution bus 204. This aircraft electrical system 190 may also include a power source 208 and/or a power storage 210. The electrical distribution bus 204 is electrically coupled to the electric machine 188 through the EM controller 192. The electrical distribution bus 204 is also electrically coupled to the power source 208 and the power storage 210. With this arrangement, the electrical distribution bus 204 provides an intermediate connection between the various electrical aircraft propulsion system members 192, 208 and 210. The power source 208 may be an electric generator powered by the turbine engine 24 (see FIG. 1) or an electric generator powered by another aircraft powerplant; e.g., an engine of a companion aircraft propulsion system, an engine of an auxiliary power unit (APU), a fuel cell system, etc. The power storage 210 is configured to receive electricity from the electrical distribution bus 204 for storage. The power storage 210 is also configured to provide the stored electricity to the electrical distribution bus 204. The power storage 210, for example, may be configured as or otherwise include one or more electricity storage devices; e.g., batteries, super capacitors, etc.

Referring to FIG. 2, it is also contemplated one of the first engine accessories 92 (e.g., 92A) may be configured as a dedicated electric machine (e.g., an electric motor-generator, an electric motor or an electric generator) associated with the first engine rotating structure 136. In addition or alternatively, it is contemplated the second engine accessory 94 may be configured as a dedicated electric machine (e.g., an electric motor-generator, an electric motor or an electric generator) associated with the second engine rotating structure 148.

In some embodiments, referring to FIG. 1, the accessory gearbox 88 may be arranged in the inner housing compartment 70. The accessory gearbox 88, for example, may be mounted to the inner case 66. The present disclosure, however, is not limited to such an exemplary accessory gearbox location or mounting arrangement.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:
1. An assembly for an aircraft powerplant, comprising:
a gearbox including a first engine power transfer apparatus, a second engine power transfer apparatus and an accessory power transfer apparatus, the first engine power transfer apparatus operatively independent from the second engine power transfer apparatus and the accessory power transfer apparatus within the gearbox, and the second engine power transfer apparatus operatively independent from the accessory power transfer apparatus within the gearbox;
a power coupler mounted to the gearbox; and
an engine accessory mounted to the gearbox, the engine accessory comprising an engine accessory rotor operatively coupled to the accessory power transfer apparatus independent of the power coupler;
during a first operating mode, the power coupler configured to operatively couple the first engine power transfer apparatus to the accessory power transfer apparatus and operatively decouple the second engine power transfer apparatus from the accessory power transfer apparatus; and during a second operating mode, the power coupler configured to operatively couple the second engine power transfer apparatus to the accessory power transfer apparatus and operatively decouple the first engine power transfer apparatus from the accessory power transfer apparatus.

2. The assembly of claim 1, wherein the gearbox extends between opposing sides of the gearbox, the power coupler is disposed to a first of the opposing sides of the gearbox, and the engine accessory is disposed to a second of the opposing sides of the gearbox.

3. The assembly of claim 1, wherein the accessory power transfer apparatus comprises a pass-through shaft extending through the gearbox.

4. The assembly of claim 1, wherein the engine accessory comprises an electric machine.

5. The assembly of claim 1, wherein the power coupler is configured as a single line replaceable unit that is removably mounted to the gearbox independent of the engine accessory.

6. The assembly of claim 1, further comprising a second engine accessory mounted to the gearbox, the second engine accessory comprising a second engine accessory rotor operatively coupled to the first engine power transfer apparatus independent of the power coupler.

7. The assembly of claim 6, further comprising a third engine accessory mounted to the gearbox, the third engine accessory comprising a third engine accessory rotor operatively coupled to the second engine power transfer apparatus independent of the power coupler.

8. The assembly of claim 1, further comprising a first engine rotating structure comprising a first turbine rotor, the first engine rotating structure operatively coupled to the gearbox through the first engine power transfer apparatus and independent of the power coupler.

9. The assembly of claim 8, further comprising a second engine rotating structure comprising a second turbine rotor, the second engine rotating structure operatively coupled to the gearbox through the second engine power transfer apparatus and independent of the power coupler.

10. An assembly for an aircraft powerplant, comprising:
a gearbox including a first engine power transfer apparatus, a second engine power transfer apparatus and an accessory power transfer apparatus, the first engine power transfer apparatus operatively independent from the second engine power transfer apparatus and the accessory power transfer apparatus within the gearbox, and the second engine power transfer apparatus operatively independent from the accessory power transfer apparatus within the gearbox;
a power coupler mounted to the gearbox; and
a lubrication system servicing the gearbox, the lubrication system fluidly decoupled from the power coupler;
during a first operating mode, the power coupler configured to operatively couple the first engine power transfer apparatus to the accessory power transfer apparatus and operatively decouple the second engine power transfer apparatus from the accessory power transfer apparatus; and
during a second operating mode, the power coupler configured to operatively couple the second engine power transfer apparatus to the accessory power transfer apparatus and operatively decouple the first engine power transfer apparatus from the accessory power transfer apparatus.

11. The assembly of claim 1, wherein the power coupler includes
a first gear system configured to operatively couple the first engine power transfer apparatus to the accessory power transfer apparatus during the first operating mode; and
a second gear system configured to operatively couple the second engine power transfer apparatus to the accessory power transfer apparatus during the second operating mode.

12. The assembly of claim 1, wherein
the gearbox further includes a gearbox housing; and
the first engine power transfer apparatus comprises a first gear system disposed in the gearbox housing.

13. The assembly of claim 12, wherein the second engine power transfer apparatus comprises a second gear system disposed in the gearbox housing.

14. An assembly for an aircraft powerplant, comprising:
a gearbox including a first engine power transfer apparatus, a second engine power transfer apparatus and an accessory power transfer apparatus, the first engine power transfer apparatus operatively independent from the second engine power transfer apparatus and the accessory power transfer apparatus within the gearbox, and the second engine power transfer apparatus operatively independent from the accessory power transfer apparatus within the gearbox; and
a power coupler mounted to the gearbox;
during a first operating mode, the power coupler configured to operatively couple the first engine power transfer apparatus to the accessory power transfer apparatus and operatively decouple the second engine power transfer apparatus from the accessory power transfer apparatus; and
during a second operating mode, the power coupler configured to operatively couple the second engine power transfer apparatus to the accessory power transfer apparatus and operatively decouple the first engine power transfer apparatus from the accessory power transfer apparatus;
wherein the power coupler comprises a first clutch configured to
operatively couple the first engine power transfer apparatus to the accessory power transfer apparatus during the first operating mode; and
operatively decouple the first engine power transfer apparatus from the accessory power transfer apparatus during the second operating mode.

15. The assembly of claim 14, wherein the power coupler further comprises a second clutch configured to
operatively couple the second engine power transfer apparatus to the accessory power transfer apparatus during the second operating mode; and
operatively decouple the second engine power transfer apparatus from the accessory power transfer apparatus during the first operating mode.

16. An assembly for an aircraft powerplant, comprising:
a gearbox including a first engine power transfer apparatus, a second engine power transfer apparatus and an accessory power transfer apparatus, the first engine power transfer apparatus operatively independent from the second engine power transfer apparatus and the accessory power transfer apparatus within the gearbox, and the second engine power transfer apparatus operatively independent from the accessory power transfer apparatus within the gearbox;
a power coupler mounted to the gearbox;

during a first operating mode, the power coupler configured to operatively couple the first engine power transfer apparatus to the accessory power transfer apparatus and operatively decouple the second engine power transfer apparatus from the accessory power transfer apparatus; and during a second operating mode, the power coupler configured to operatively couple the second engine power transfer apparatus to the accessory power transfer apparatus and operatively decouple the first engine power transfer apparatus from the accessory power transfer apparatus;

a compressor section, a combustor section, a first turbine section, a second turbine section and a flowpath extending through the compressor section, the combustor section, the first turbine section and the second turbine section from an inlet into the flowpath to an exhaust from the flowpath;

a first engine rotating structure comprising a first turbine rotor disposed in the first turbine section, the first engine rotating structure operatively coupled to the power coupler through the first engine power transfer apparatus; and a second engine rotating structure comprising a second turbine rotor disposed in the second turbine section, the second engine rotating structure operatively coupled to the power coupler through the second engine power transfer apparatus.

17. An assembly for an aircraft powerplant, comprising:

a gearbox including a gearbox housing, a first gear system, a second gear system and a pass-through shaft, the first gear system, the second gear system and the pass-through shaft disposed in the gearbox housing, and the pass-through shaft mechanically independent of the first gear system and the second gear system in the gearbox housing; and a power coupler outside of the gearbox and mounted to the gearbox housing as a single self-contained unit;

during a first operating mode, the power coupler configured to operatively couple the first gear system to the pass-through shaft and operatively decouple the second gear system from the pass-through shaft; and during a second operating mode, the power coupler configured to operatively couple the second gear system to the pass-through shaft and operatively decouple the first gear system from the pass-through shaft.

* * * * *